July 15, 1969     W. E. POLITZ     3,455,581

MEANS TO CONNECT THREADED AND NON-THREADED SURFACES

Filed Dec. 22, 1966

INVENTOR.
W. E. POLITZ
BY Robert Poss
attorneys

United States Patent Office 3,455,581
Patented July 15, 1969

3,455,581
MEANS TO CONNECT THREADED AND NON-THREADED SURFACES
William E. Politz, Delphi, Ind., assignor to
Stephen A. Young, Monticello, Ind.
Filed Dec. 22, 1966, Ser. No. 609,703
Int. Cl. F16l 13/08, 47/02
U.S. Cl. 285—287
2 Claims

ABSTRACT OF THE DISCLOSURE

The disclosure hereof is directed to connection of a threaded surface of a pipe, fitting, or the like, with an unthreaded surface by providing a coil member seated in or on the threads and of a diameter to be reasonably closely spaced with respect to a mating part, securing of the respective parts being accomplished by sweating or soldering, since metal parts are contemplated to be involved.

---

This invention relates to the connection of threaded and non-threaded surfaces and particularly to the connection which is often required to be made in plumbing installations of various kinds as by connecting of the fittings for controlling liquid flow with tubular liquid carrying lines such as copper tubing or the like.

The particular application of the instant invention finds its most useful employment in the area of connection of fittings which would normally be sweated in place as the expression is used, which fittings are commonly supplied in the industry with threaded inlets and outlets largely because of tradition and requiring that adaptors of various forms and shapes be supplied and used if the sweat type of connection is desired to be employed.

Where formerly, connection of fittings was effected by threading of the pipe and engaging the same with corresponding threads in the fittings, by the present day practices, as a labor-saving expedient, the sweat connection of the same with copper tubing which supplies the liquid and carries the liquid from place to place is most often resorted to, this requiring that an adaptor be employed at one end to which the fitting is connected and by a sweating operation employing solder a sealed joint is effected.

As will be readily appreciated, the more joints required, the more possibility of leakage between or within said joints will exist, and it is therefore a principal advance provided by this invention that the number of joints is reduced, the necessity to employ an additional fitting for making the connection is eliminated, and rapidity of connection of the various fittings with tubing is substantially increased.

The present invention is directed to the provision of a metal spring-like part to be inserted in threads of a fitting and in turn receive an unthreaded member therein, the various areas thereafter being secured by a soldering or sweating operation to produce a leak-proof connection. It is contemplated that both male and female threads may be accommodated by the contemplation hereof.

Further advantages and improvements provided by this invention will be understood from a consideration of the specification appended hereto and disclosed in the drawing wherein.

Figure 1:
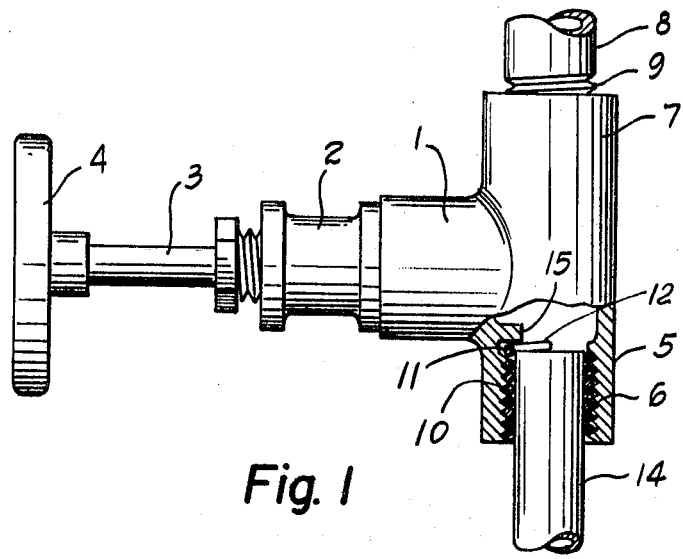
FIGURE 1 is a fragmentary view showing a valve of common form in which the invention is employed for connection to the supply to be controlled by said valve.

Referring to FIGURE 1, the valve which is provided as a basis for the description herein, includes a body 1 having a bonnet 2 connected thereto through which the stem 3 extends and in which the threaded portion of the stem is provided within the body 1 not disclosed but well known to those skilled in the art.

A suitable handle 4 may be supplied for the stem 3 all of the foregoing being by way of illustration and useful application, of the invention herein.

Figure 2:
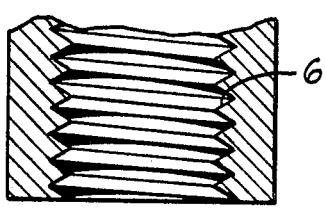
FIGURE 2 is a fragmentary enlarged view illustrating the threads which are normally supplied in such a valve.

It will be noted that in this particular instance the inlet portion denoted 5 of the valve body 1, is provided with threads such as 6 shown in enlarged detail in FIGURE 2, being commonly of ½ inch iron pipe size for example and straight in this particular disclosure.

A suitable outlet section 7 is provided for the body 1 and in this instance the common form of pipe 8 is shown connected by the usual threads 9 to a corresponding threaded section within the outlet portion 7 of the body 1. Pipe 8 is disclosed merely as exemplary of the common presently availed of form of connection and could be replaced by the means hereinafter to be described in detail.

Shown within the threads 6 of the inlet end 5 of the valve body 1, is a spring-like member 10 which includes a series of coils, some six in number in this particular instance, in which the coils are formed of a wire of uniform diameter, the coils themselves being of a suitable diameter such that they may be threadedly engaged with threads 6 as disclosed in FIGURE 1.

For the purposes of effecting the threaded engagement of the coil member 10, one end thereof is formed with a section 11 at the extremity of the coil, a member 12 being arranged closely to the same so as to provide what is the equivalent of a screw driver slot for example. This screw driver opening designated 13, is provided for engagement by a screw driver to effect the rotation of the coil member 10 in its entirety into threaded engagement and the position shown in FIGURE 1.

It is pointed out that the individual coil members of the coil member 10 are arranged preferably with a pitch like that of the threads 6 and thus will be in contact with said threads at least on two points on the exterior of the coils.

The result of the foregoing is to present a cylindrical planar area within the coil adapted to receive therewithin the tube end 14 as shown in FIGURE 1, so that the surface of the tube 14 at the end thereof engages or lies closely along the interior of the individual coils comprising the coil member 10 in said planar area.

There may preferably be provided within the inlet end a suitable stop such as 15 so that the coil member may only be screwed in as far as that stop and thereafter the screw driver portion including parts 11 and 12 will effectively prevent the insertion of a tube to any greater extend than is absolutely necessary during assembly of the parts hereinbefore described.

When the parts have been placed as shown in FIGURE 1, the same are heated by any suitable source of heat and solder applied in the manner of making a usual sweat connection.

The solder will flow in the threaded areas and between the coils and engage with the threads, the individual coils and the surface of the tubular part 14 to effect a water tight, pressure tight connection.

It is apparent that the respective sizes of these various parts are arranged such that suitable contact is maintained between them and yet at the same time flow the solder by capillary action and the action of heat will provide the desired water tight, pressure tight connection. The foregoing will eliminate the use of an adapter which might normally be provided, the adapter having a screw thread section on one end to be received within the threads 6 of the inlet 5 and a smooth mating surface for the tubular end 14 to which the same is intended to be sweated, there thus being in effect two distinct possible leakage areas unless every condition of the connecting operation is effected properly and perfectly.

Figure 5:
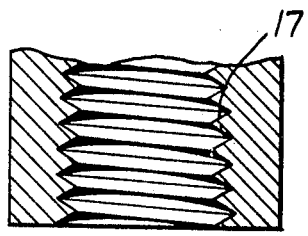
FIGURE 5 is a fragmentary sectional view illustrating another form of thread.
Figure 3:
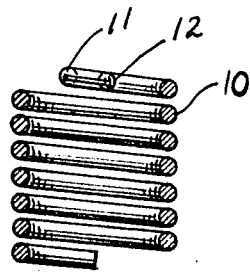
FIGURE 3 is an enlarged view in section, disclosing a coil member which is used in effecting the connection hereof.
Figure 6:
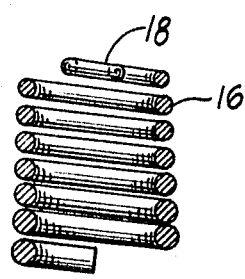
FIGURE 6 is a further form and a modification of the type of coil member used with the thread of FIGURE 5.
Figure 4:
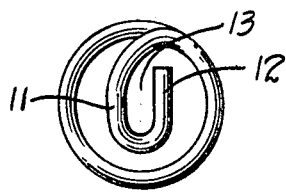
FIGURE 4 is an end view of a coil such as disclosed in FIGURE 3.

In FIGURE 5 there is disclosed a tapered thread which might be supplied at the inlet end 5 or the outlet end 7 as the case may be, and for this purpose a special coil member 16 may be supplied to engage with the threads 17 disclosed in FIGURE 5. It will be noted that the cross sectional area of the coil member 16 must vary or will preferably vary to effect the best kind of connection but there is no reason why under some circumstances where the taper is small that a straight threaded coil member like that in FIGURE 3 cannot be used and the sweat connection effected in any event.

A similar screw driver area 18 is provided for the coil member 16 as is true in the coil member 10 previously described in detail.

It is noted that while the female threaded area of the inlet end 5 is disclosed here as having seated therewithin a suitable coil member 10 for engagement by the tubular end 14 of the tube, it is obvious that the respective parts could in effect be reversed so that a male threaded portion having seated thereon a suitable coil member of the nature herein disclosed could be seated in a female tubular opening and sweat connection effected therebetween the various parts thus actually being a complete reversal of the disclosure herein but contemplated hereby.

It should also be pointed out that, while the wire of the coil members 10 and 16 is shown as being round, a shape closely conforming to the threads, as triangular could be availed of if found desirable.

The application of the concept herein disclosed, will readily be perceived as being widespread both in new and old work and whereas the parts are preferably formed of copper or copper derivatives, that is the body 1, the spring-like coil member 10 and the tube 14 there is no particular reason why other types of material cannot be used and connected effected.

It should be noted that wihle the sweat connection is specified, it is contemplated by this invention that other material which will flow by reason of its inherent characteristics or under heat such as solder may be used to effect the connection herein described in detail to take advantage of the concept of connecting threaded portions with non-threaded portions as broadly contemplated hereby.

I claim:

1. In a sweat type plumbing connection including complementary male and female members, the combination comprising: a first metallic member including a generally tubular body portion, wall means defining a bore extending into said body, said wall means including an internally threaded female portion adjacent one end thereof, a second metallic member generally tubular in form and including a generally smooth outer wall portion of substantially constant diameter, said second member of relatively smaller diameter than the threaded portion of the bore of said first member and selectively positioned within said threaded portion in generally male and female telescoping relation, a third intermediate metallic member selectively carried by said male and female metallic members mechanically interconnecting said male and female members, said intermediate member comprising a substantially helical metallic body proportioned to partially engage the threads of the threaded portion and accommodate the difference between the threaded bore portion of the female member and the smooth outer wall of the male member whereby said male and female portions are in supporting mechanical contact with each other through the medium of the intermediate member, each of said first, second and third members fabricated from metallic material responsive to heat and soldered together to form a fluid-tight seal therebetween.

2. The combination defined by claim 1, wherein the threaded wall means of said female member is of inwardly tapering configuration, and said intermediate member is of externally tapered and internally uniform diameter.

References Cited

UNITED STATES PATENTS

| 701,019 | 5/1902 | Diescher | 285—355 X |
| 1,995,006 | 3/1935 | Mueller et al. | 285—287 |
| 2,145,168 | 1/1939 | Flagg | 151—14.5 X |
| 3,062,568 | 11/1962 | Andresen et al. | 285—355 X |
| 3,062,940 | 11/1962 | Bauer et al. | 285—21 X |
| 1,871,371 | 7/1929 | Jackson | 285—287 X |

FOREIGN PATENTS

| 1,150,818 | 8/1957 | France. |

CARL W. TOMLIN, Primary Examiner

DAVE W. AROLA, Assistant Examiner

U.S. Cl. X.R.

29—472.1, 489; 285—175, 390